United States Patent
Higuchi et al.

(10) Patent No.: US 9,650,076 B2
(45) Date of Patent: May 16, 2017

(54) VEHICLE FRONT BODY STRUCTURE

(71) Applicant: HONDA MOTOR CO., LTD, Tokyo (JP)

(72) Inventors: Eisei Higuchi, Wako (JP); Ken Yasui, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/979,878

(22) Filed: Dec. 28, 2015

(65) Prior Publication Data

US 2016/0185392 A1 Jun. 30, 2016

(30) Foreign Application Priority Data

Dec. 25, 2014 (JP) ................ 2014-262245

(51) Int. Cl.
*B62D 21/15* (2006.01)
*B62D 25/08* (2006.01)

(52) U.S. Cl.
CPC ......... *B62D 21/152* (2013.01); *B62D 25/085* (2013.01)

(58) Field of Classification Search
CPC .... B62D 21/11; B62D 21/152; B62D 21/155; B62D 25/085; B60R 2021/0009; B60R 2021/0023
See application file for complete search history.

(56) References Cited

U.S. PATENT DOCUMENTS

| | | | | |
|---|---|---|---|---|
| 6,957,846 B2* | 10/2005 | Saeki | ................ | B62D 21/152 180/232 |
| 7,469,956 B2* | 12/2008 | Yasuhara | ............... | B60R 19/34 293/133 |
| 8,118,349 B2* | 2/2012 | Kihara | ................ | B62D 21/152 296/187.09 |
| 8,585,129 B2* | 11/2013 | Mori | ................ | B62D 21/152 296/187.09 |

(Continued)

FOREIGN PATENT DOCUMENTS

JP 2003-112260 A 4/2003
JP 2006-137373 A 6/2006

(Continued)

OTHER PUBLICATIONS

Office Action dated Nov. 21, 2016, issued in counterpart Japanese Application No. 2014-262245, with English translation (13 pages).

*Primary Examiner* — Laura Freedman
(74) *Attorney, Agent, or Firm* — Westerman, Hattori, Daniels & Adrian, LLP

(57) ABSTRACT

A vehicle body includes left and right front side frames extending in a vehicle front-to-rear direction. A power unit is disposed between the front side frames. Each of the left and right front side frames includes an inner frame disposed at a vehicle widthwise center side and an outer frame superposed on a vehicle outer side of the inner frame, and has a closed quadrangular sectional shape that is formed by the inner frame and the outer frame. A front portion of the outer frame has a triangular portion that has a substantially triangular shape whose width decreases from front to rear. Each front side frame has a power unit mount-fastening portion at a location rearward of the triangular portion.

9 Claims, 5 Drawing Sheets

(56) References Cited

U.S. PATENT DOCUMENTS

| | | | |
|---|---|---|---|
| 8,764,096 B2* | 7/2014 | Han | B60R 19/18 |
| | | | 296/133 |
| 8,789,877 B2 | 7/2014 | Ohnaka et al. | |
| 9,016,767 B2* | 4/2015 | Sotoyama | B62D 21/152 |
| | | | 296/187.09 |
| 9,016,768 B2* | 4/2015 | Makino | B62D 21/155 |
| | | | 296/187.1 |
| 9,027,695 B2 | 5/2015 | Nakamura et al. | |
| 9,102,289 B2* | 8/2015 | Braunbeck | B60R 19/34 |
| 9,205,793 B2* | 12/2015 | Iijima | B60R 19/24 |
| 9,233,714 B2* | 1/2016 | Hara | B62D 21/09 |
| 9,308,940 B1* | 4/2016 | Malavalli | B62D 25/082 |
| 9,399,489 B2* | 7/2016 | Iwama | B62D 25/082 |
| 2012/0248820 A1 | 10/2012 | Yasui et al. | |
| 2015/0183468 A1* | 7/2015 | Shirooka | B62D 25/082 |
| | | | 296/187.1 |

FOREIGN PATENT DOCUMENTS

| | | |
|---|---|---|
| JP | 2010-70133 A | 4/2010 |
| JP | 2010-221991 A | 10/2010 |
| JP | 2013-193571 A | 9/2013 |
| JP | 2013-212757 A | 10/2013 |
| JP | 5357953 B2 | 12/2013 |
| JP | 2014-58184 A | 4/2014 |
| JP | 2014-234148 A | 12/2014 |

* cited by examiner

VEHICLE FRONT BODY STRUCTURE

CROSS REFERENCES TO RELATED APPLICATIONS

The present application claims priority under 35 U.S.C. §119 to Japanese Patent Application No. 2014-262245, filed Dec. 25, 2014, entitled "Vehicle Front Body Structure." The contents of this application are incorporated herein by reference in their entirety.

BACKGROUND

1. Field

The present disclosure relates to a vehicle front body structure in which a power unit is disposed between left and right front side frames.

2. Description of the Related Art

A vehicle body structure in which left and right front side frames extend in a vehicle front-to-rear direction and a power unit is disposed between these front side frames is generally known. A related-art technology relevant to such a vehicle body is disclosed in Japanese Patent No. 5357953.

In a vehicle front body structure as shown in this patent document, an engine is disposed between the left and right front side frames. The engine is fastened to the left and right front side frame via engine fastening portions that are provided on the left and right front side frames. Furthermore, frames called branch frame are attached to front portions of the left and right front side frames.

Each branch frame has a substantially V shape, extends outward in a vehicle width direction from a front end of one of the front side frames, and extends obliquely from a site outward in the vehicle width direction to a vicinity of the engine fastening portion.

As for collision load that acts on the vehicle body, there is a so-called narrow offset collision in which collision load is input to a vehicle width outer-side portion. Load input to a branch frame acts in the vicinity of the engine fastening portion so as to deform the front side frame toward a vehicle widthwise center. The front side frame absorbs collision energy through deformation.

The foregoing vehicle front body structure needs to employ the branch frames in order to secure high collision energy absorption capacity, increasing the number of component parts.

SUMMARY

The present application describes a vehicle body that has high impact absorbing capability while employing a relatively small number of component parts.

According to one aspect of the present disclosure, a vehicle front body structure includes left and right front side frames which extend in a vehicle front-to-rear direction and between which a power unit is disposed. Each of the left and right front side frames includes an inner frame disposed at a vehicle widthwise center side and an outer frame superposed on a vehicle outer side of the inner frame, and has a closed quadrangular sectional shape that is formed by the inner frame and the outer frame (a rectangular cross-section in a vehicle width direction). A front portion of the outer frame has a triangular portion that has, in a plan view, a substantially triangular shape whose width decreases from a forward side to a rearward side. Each front side frame has, at a location rearward of the triangular portion, a power unit mount-fastening portion to which the power unit is fastened.

According to the foregoing aspect of the present disclosure, in each of the left and right front side frame, the front portion of the outer frame is formed by the triangular portion that has a substantially triangular shape whose width decreases from front to rear, and the power unit mount-fastening portion is formed rearward of the triangular portion. The cross-sectional area of each front side frame along the vehicle width direction is large at the front end and gradually decreases therefrom to the rearward side. When a narrow offset collision occurs, collision load acts on the triangular portion and is transmitted toward a rearward portion of the front side frame. A portion of each front side frame which is rearward of the triangular portion is smaller in cross-sectional area and lower in strength than the triangular portion. However, the power unit mount-fastening portion is a portion that supports the power unit, which is heavy in weight, and that has high strength. Therefore, when collision load is input, the front side frame bends toward the vehicle widthwise center, at a site between the triangular portion and the power unit mount-fastening portion. As the front side frame bends to a vehicle inner side, collision energy can be absorbed. Furthermore, as the front side frame bends, load can be transmitted to the other-side front side frame via the power unit. Then, the other-side front side frame is bent by the power unit. This construction further enhances the impact absorbing capability. In order to achieve high impact absorbing capability, the front portion of each front side frame is composed of the triangular portion. High impact absorbing capability can be achieved through the changing of the shape of the front side frames alone. Therefore, it is possible to provide a vehicle body that has high impact absorbing capability while employing a relatively small number of component parts.

In the foregoing construction according to the aspect of the present disclosure, a side of the substantially triangular shape may be an oblique side that extends to the rearward side and the vehicle widthwise center side. Furthermore, an imaginary extended line obtained by linearly extending the oblique side rearward may extend in the vehicle widthwise center side of the power unit mount-fastening portion.

In this construction, the imaginary extended line of the oblique side of the triangular portion extends in a space on the vehicle widthwise center side of the power unit mount-fastening portion. Therefore, the front side frames will more certainly and easily bend to the vehicle widthwise center side.

In the foregoing construction, a front end of the outer frame and a front end of the inner frame may be joined to a connection member so that the front end of the outer frame and the front end of the inner frame are interconnected.

This construction operates as follows. When a narrow offset collision occurs, load may possibly act in such a direction as to separate the outer frame from the inner frame. However, the interconnection of the outer frame and the inner frame at their front ends will restrain such separation of the outer frame from the inner frame.

A vehicle outer-side end of the connection member may be located more rearward than a vehicle widthwise center-side end portion of the connection member.

In this construction, collision impact at the time of a narrow offset collision can be guided to the vehicle widthwise center side. Furthermore, the bending moment to the inner side will be promoted, the separation of the outer frame from the inner frame will be restrained, and the bending of the front side frame to the inner side will be facilitated.

In the foregoing construction, a rear portion of the triangular portion may be provided with a reinforcement member that is disposed from the vehicle outer side.

This construction operates as follows. The rear portion of the triangular portion is smaller in cross-sectional area and lower in strength than a front portion of the triangular portion. The provision of the reinforcement member restrains the front side frame from bending at the triangular portion. Therefore, load can be more certainly transmitted to a site forward of the power unit mount-fastening portion so that the front side frame will bend toward the vehicle width center.

In the foregoing construction according to the aspect of the present disclosure, each of the left and right front side frames may have a fragile portion at a site between the triangular portion and the power unit mount-fastening portion.

In this construction, the provision of the fragile portion allows the front side frame to easily bend to the vehicle widthwise center side. Therefore, the front side frame will more certainly bend at a site forward of the power unit mount-fastening portion.

Furthermore, in each of the left and right front side frames, a site between the triangular portion and the fragile portion may be provided with a bulkhead that partitions a space that has the closed quadrangular sectional shape.

In this construction, the provision of the bulkhead promotes transmission of load from the triangular portion to an inner side wall of the front side frame and allows the front side to easily bend to the inner side. Moreover, the strength of a portion of the front side frame where the bulkhead is provided is enhanced by the bulkhead. Therefore, the bending of the front side frame at a site forward of the fragile portion will be restrained and the front side frame will more certainly bend at the fragile portion.

In the foregoing construction, the triangular portion may have a bead that extends in a vehicle width direction.

The provision of the bead increases the bending rigidity of the triangular portion in the vehicle width direction, so that the front side frame will more certainly bend at a site forward of the power unit mount-fastening portion. Moreover, the formation of the bead on the triangular portion increases the surface rigidity. Therefore, restraint of the production of noise due to vibration, that is, improvement of noise/vibration (NV) performance, can be expected.

In the forgoing construction, the outer frame may have a substantially U shape whose opening faces the inner frame, and a boundary portion between a bottom portion of the outer frame and a wall portion of the outer frame may have a bead shape.

Due to this construction, the bending rigidity of the triangular portion in the front-to-rear direction increases, so that the front side frame will more certainly bend at a site forward of the power unit mount-fastening portion. Moreover, since the boundary portion has a bead shape, the number of ridges extending substantially in the vehicle width direction increases. Therefore, when a narrow offset collision occurs, collision load will be more certainly transmitted from vehicle-widthwise outward to an inner side of the front side frame.

DESCRIPTION OF THE PREFERRED EMBODIMENTS

Figure 1:
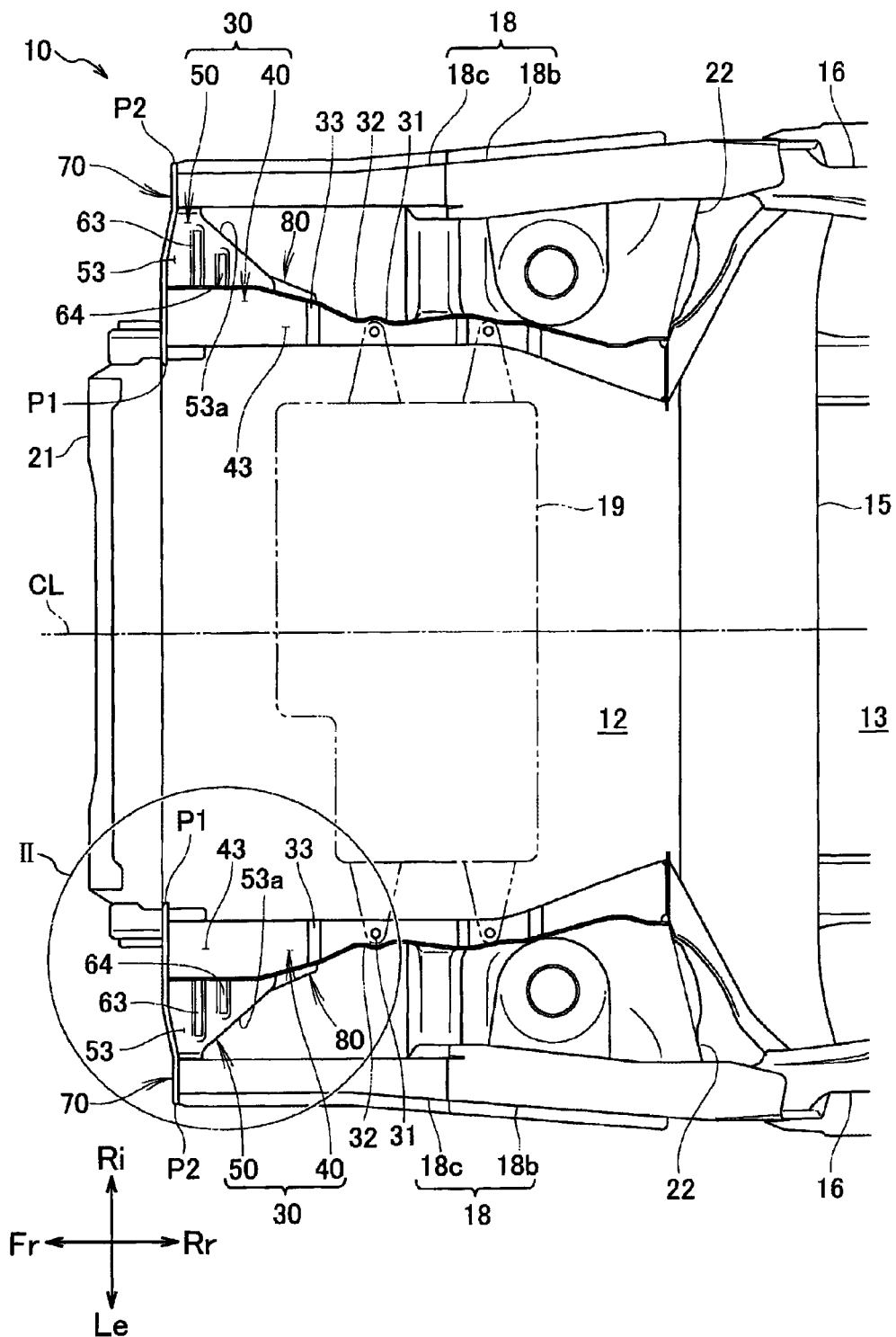
FIG. 1 is a plan view of a vehicle body that employs a vehicle front body structure according to an embodiment of the present disclosure.

Embodiments of the present disclosure will be described hereinafter with reference to the accompanying drawings. In the description, the terms left and right refer to left and right with reference to an occupant of a vehicle, and front and rear refer to front and rear in the direction in which the vehicle normally runs. Furthermore, in the drawings, Fr represents front, Rr represents rear, Le represents left from an occupant, Ri represents right from the occupant, Up represents upward, Dn represents downward, and Ce represents a vehicle widthwise center.

Embodiments

As shown in FIG. 1, inside a vehicle body 10, an engine compartment 12 is formed in front and a cabin 13 is formed right behind the engine compartment 12. The vehicle body 10 is made up of a monocoque body and is substantially bilaterally symmetrical about a vehicle widthwise center line CL that extends in a vehicle front-to-rear direction through the center in the vehicle width direction.

The engine compartment 12 and the cabin 13 are partitioned from each other by a dashboard lower panel 15. Left and right ends of the dashboard lower panel 15 are coupled to left and right front pillars 16 and 16.

The vehicle body 10 includes left and right front side frames 30 and 30 and left and right lower members 18 and 18. The left and right front side frames 30 and 30 are positioned at left and right sides in a front section of the vehicle body 10 and extend in the front-to-rear direction of the vehicle body 10. A power unit 19 is disposed between the left and right front side frames 30 and 30. A front bulkhead 21 is provided in front of the left and right front side frames 30 and 30.

The left and right lower members 18 and 18 extend forward from the left and right front pillars 16 and 16. The left and right lower members 18 and 18 are made up of horizontal portions 18b and 18b that extend substantially horizontally from the left and right front pillars 16 and 16 and descent portions 18c and 18c that descend forward from distal ends of the horizontal portions 18b and 18b, respectively. The descent portions 18c and 18c are curved so as to avoid interference with front wheels.

Left and right damper housings 22 and 22 extend between and are connected to the left and right front side frames 30 and 30 and the left and right lower members 18 and 18, respectively. Hereinafter, an embodiment will be described in detail with respect to the left front side frame 30 as an example.

Figure 2:
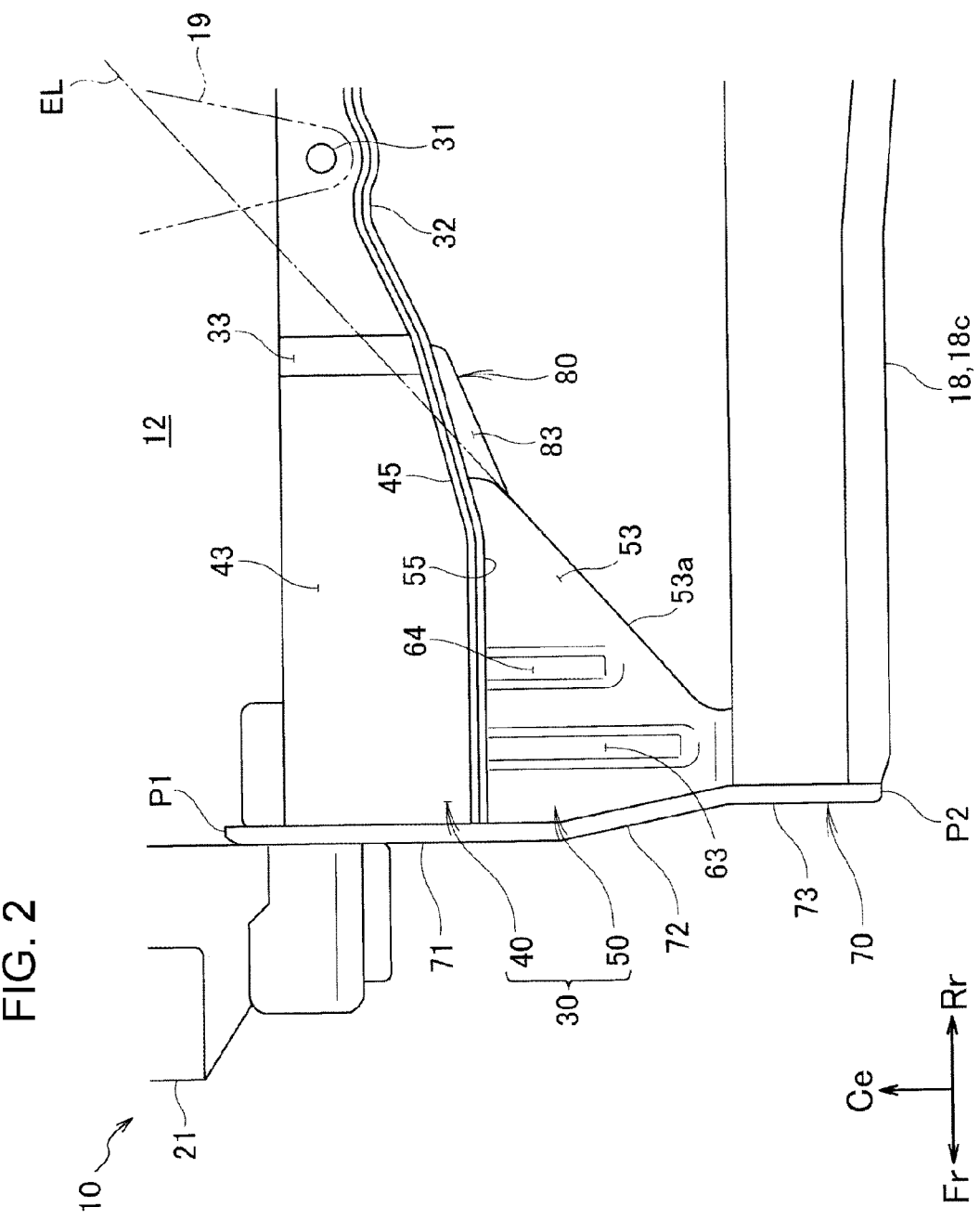
FIG. 2 is an enlarged view of a circled area II shown in FIG. 1.

Referring to FIG. 2, the front side frame 30 is provided with a power unit mount-fastening portion 31 for fastening the power unit 19. At this power unit mount-fastening portion 31, the power unit 19 is supported by the front side frame 30. The power unit mount-fastening portion 31 is larger in width than portions of the front side frame 30 that are forward and rearward of the power unit mount-fastening portion 31.

In the front side frames 30 and a site immediately forward of the power unit mount-fastening portion 31 is provided with a fragile portion 32 that is waned to a vehicle widthwise center side. The fragile portion 32 is narrower in width than portions forward and rearward of the fragile portion 32. The fragile portion 32 is reduced in cross-sectional area compared with other portions of the front side frame 30 so as to have a reduced bending rigidity. The fragile portion 32 extends forward continuously from the power unit mount-fastening portion 31.

A bulkhead 33 is provided in front of the fragile portion 32. The bulkhead 33 partitions a space inside the front side frame 30 that has a closed cross-sectional shape.

Figure 3:
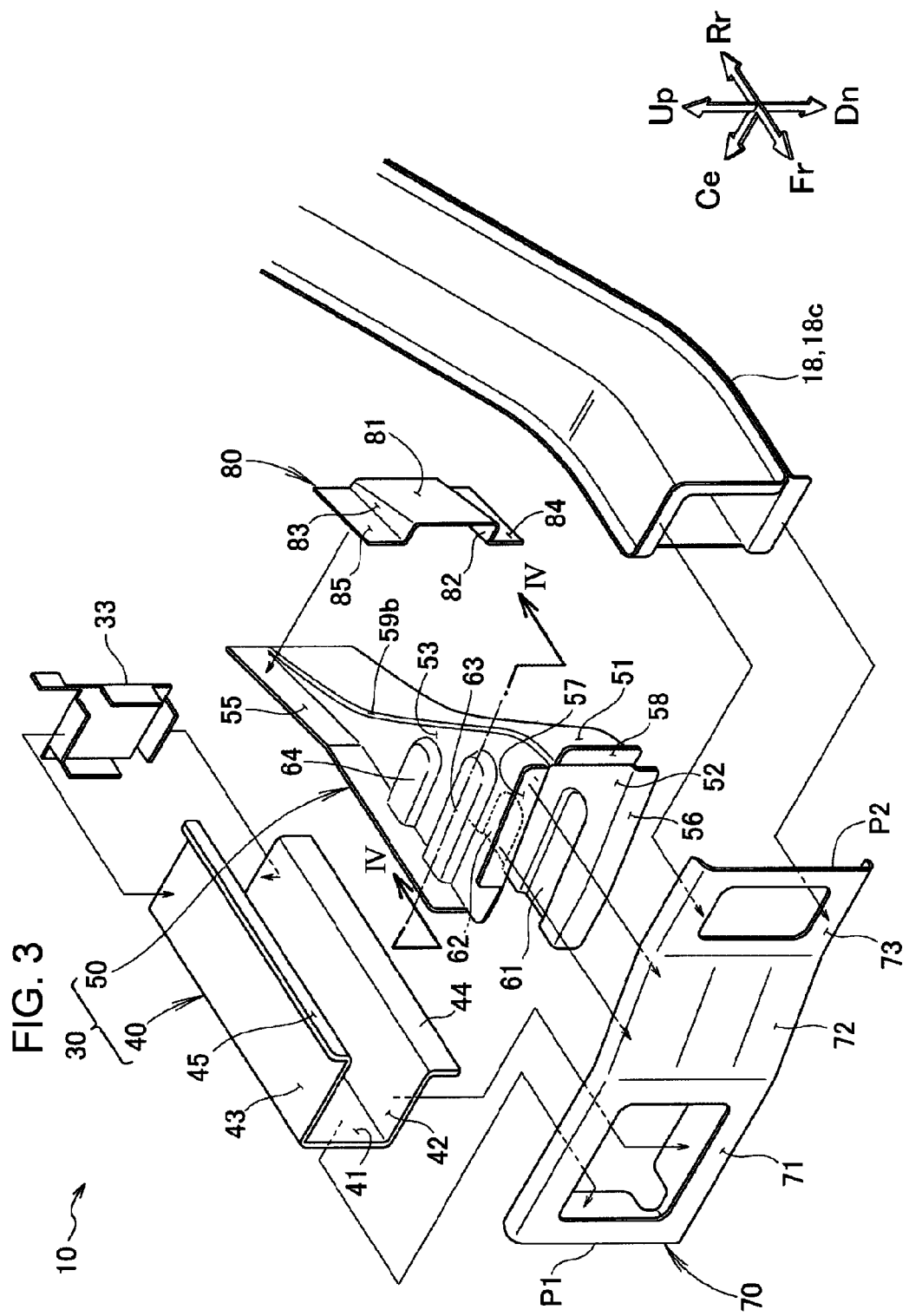
FIG. 3 is an exploded perspective view of a front side frame, a lower member, a bulkhead, a reinforcement member, and a connection member shown in FIG. 2.

Referring to FIG. 3, the front side frame 30 is made up of an inner frame 40 disposed at the vehicle widthwise center side and an outer frame 50 superposed on a vehicle outer side of the inner frame 40. The front side frame 30 is formed by the inner frame 40 and the outer frame 50 so as to have a substantially quadrangular closed cross-sectional shape.

A front end of the outer frame 50 and a front end of the inner frame 40 are joined to a connection member 70 and therefore interconnected to each other.

A reinforcement member 80 is welded to the outer frame 50 from a vehicle widthwise outward side.

The inner frame 40 has a substantially U shape that has an opening toward the outer frame 50 and that is formed by an inner frame bottom portion 41 positioned at the vehicle widthwise center side, inner frame wall portions 42 and 43 extending from lower and upper ends of the inner frame bottom portion 41, respectively, to the vehicle widthwise outward side, an inner frame lower flange 44 extending downward from a distal end of the lower-side inner frame wall portion 42, and an inner frame upper flange 45 extending from a distal end of the upper-side inner frame wall portion 43.

The outer frame 50 has a substantially U shape whose opening faces the inner frame 40, and is formed by an outer frame bottom portion 51 (bottom portion 51) positioned at the vehicle widthwise outward side, outer frame wall portions 52 and 53 (wall portions 52 and 53) extending from lower and upper ends of the outer frame bottom portion 51, respectively, to the vehicle widthwise center side, an outer frame lower flange 54 (see FIG. 4) extending downward from a distal end of the lower-side outer frame wall portion 52 and welded to the inner frame lower flange 44, an outer frame upper flange 55 extending upward from a distal end of the upper-side outer frame wall portion 53 and welded to the inner frame upper flange 45, an outer frame front lower flange 56 extending downward from a front end of the lower-side outer frame wall portion 52 and welded to the connection member 70, an outer frame front upper flange 57 extending upward from a front end of the upper-side outer frame wall portion 53 and welded to the connection member 70, and an outer frame front intermediate flange 58 extending from a front end of the outer frame bottom portion 51 to the vehicle widthwise outward side and welded to the connection member 70.

Figure 4:
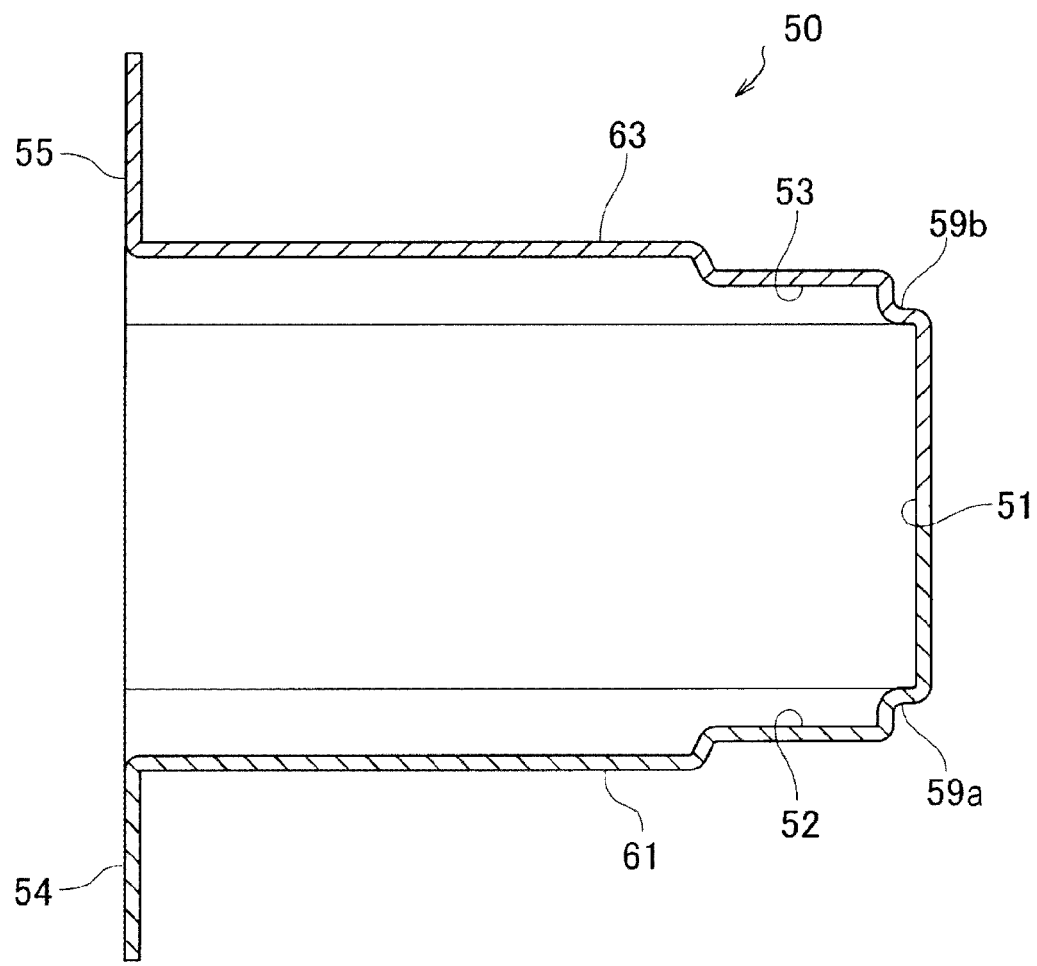
FIG. 4 is a sectional view taken on line IV-IV in FIG. 3.
Figure 4:
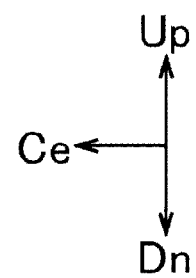

Referring to FIG. 4, boundary portions 59*a* and 59*b* between the outer frame bottom portion 51 and the outer frame wall portions 52 and 53 have a bead shape that is caved inward.

Referring back to FIG. 3, The lower-side outer frame wall portion 52 has, in a bottom view, a substantially triangular shape whose width decreases from front to rear. The upper-side outer frame wall portion 53 has, in a plan view, a substantially triangular shape whose width decreases from front to rear. That is, the outer frame wall portions 52 and 53 can also be termed triangular portions 52 and 53. Hereinafter, the outer frame wall portions 52 and 53 will sometimes be referred to also as "triangular portions 52 and 53", as appropriate.

A front portion of the outer frame 50 has the triangular portions 52 and 53 that have a substantially triangular shape whose width decreases from front to rear in a plan view or a bottom view. The triangular portions 52 and 53 are provided with beads 61 to 64 that extend in the vehicle width direction (left-to-right direction). The beads 61 and 62 are bulged downward. The beads 63 and 64 are bulged upward. Incidentally, the numbers and the directions of the beads 61 to 64 formed can be arbitrarily determined. Furthermore, the beads 61 to 64, if not needed, do not need to be formed.

The connection member 70 has a first planar portion 71 which extends in the vehicle width direction and to which the front end of the inner frame 40 is welded, a second planar portion 72 which extends from the first planar portion 71 to the vehicle widthwise outward side and a rearward side and to which the outer frame 50 is welded, and a third planar portion 73 which extends in the vehicle width direction from the second planar portion 72 to the vehicle widthwise outward side and to which the lower member 18 is welded. Therefore, of the connection member 70, a vehicle outer-side end portion P2 is positioned more rearward than a vehicle widthwise center-side end portion p1.

The reinforcement member 80 is formed by a reinforcement member bottom portion 81 superposed on the outer frame bottom portion 51, reinforcement member wall portions 82 and 83 superposed on rear end portions of the outer frame wall portions 52 and 53 (the triangular portions 52 and 53), a reinforcement member lower flange 84 extending in the up-down direction along the outer frame lower flange 54 and welded to the outer frame lower flange 54, and a reinforcement member upper flange 85 extending in the up-down direction along the outer frame upper flange 55 and welded to the outer frame upper flange 55. The reinforcement member wall portions 82 and 83 have a substantially triangular shape in a plan view.

Referring back to FIG. 2, the triangular portion 53 having a substantially triangular shape has an oblique side 53*a* that extends to the vehicle widthwise center side and the rearward side. An imaginary extended line EL obtained by linearly extending the oblique side 53*a* rearward extends in the vehicle widthwise center side (in a space on the vehicle widthwise center side) of the power unit mount-fastening portion 31.

The present disclosure achieves the following advantageous effects.

Referring to FIG. 1, front portions of the outer frames 50 and 50 of the left and right front side frames 30 and 30 are formed by the triangular portions 52 (not shown in FIG. 1) and 53 that have a substantially triangular shape whose width decreases from front to rear. The power unit mount-fastening portions 31 and 31 are formed rearward of the triangular portions 52 and 53. The cross-sectional area of each of the front side frames 30 and 30 taken along the vehicle width direction is large at the front end and gradually decreases rearward.

Figure 5:
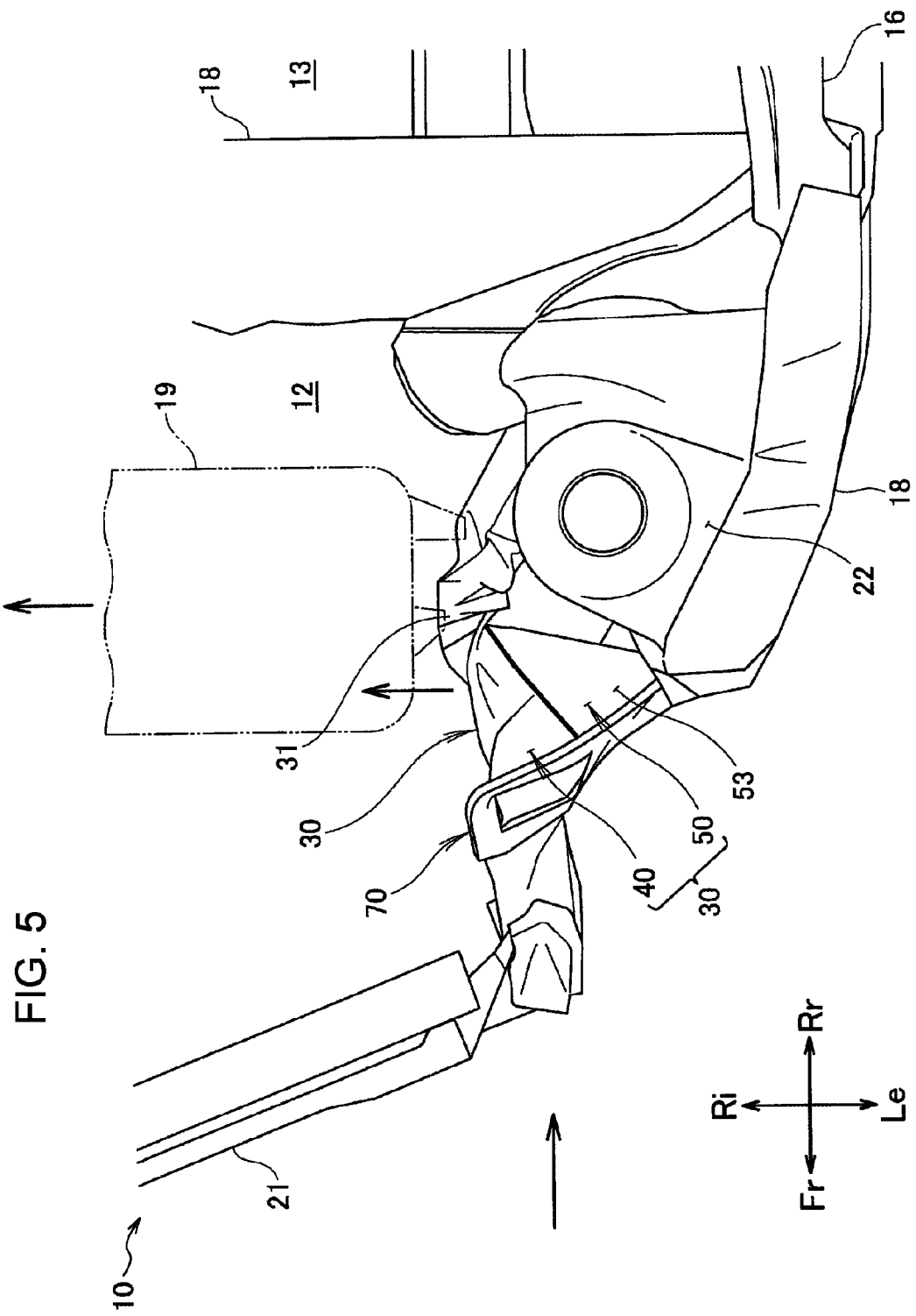
FIG. 5 is a view illustrating an operation that occurs when a collision load is input to the vehicle body shown in FIG. 2.

Referring to FIG. 5, when a narrow offset collision occurs, the collision load acts on the triangular portions 52 (not shown in FIG. 5) and 53 is transmitted toward a rear portion of the front side frame 30. A portion of the front side frame 30 rearward of the triangular portions 52 and 53 is smaller in cross-sectional area and lower in strength than the triangular portions 52 and 53. However, the power unit mount-fastening portion 31, which supports the power unit 19 that is heavy in weight, is high in strength. Therefore, upon input of collision load of a narrow offset collision, the front side frame 30 bends, at a site between the triangular portions 52 and 53 and the power unit mount-fastening portion 31, toward the vehicle widthwise center. As the front side frame 30 bends to the inner side, collision energy can be absorbed.

Referring also to FIG. 1, due to the bending of the front side frame 30 (the left front side frame 30), load can be transmitted via the power unit 19 to the opposite-side front side frame 30 (the right-side front side frame 30). The opposite-side front side frame 30 is bent by the power unit 19. This achieves further enhanced impact absorbing capability.

In order to achieve high impact absorbing capability, the front portions of the front side frames 30 and 30 are formed by the triangular portions 52 and 53. High impact absorbing capability can be achieved through the changing of the shape of the front side frames 30 and 30 alone. Therefore, it is possible to provide a vehicle body 10 that has high impact absorbing capability while employing only a small number of component parts.

Furthermore, of the left and right front side frames 30 and 30, portions where the power unit mount-fastening portions 31 and 31 are formed are more protruded outward in the vehicle width direction than portions forward and rearward of those portions. Due to this construction, the cross-sectional area of the power unit mount-fastening portions 31 and 31 along the vehicle width direction is increased and the bending rigidity of the power unit mount-fastening portions 31 and 31 can be enhanced. This restrains the power unit mount-fastening portions 31 and 31 from deforming when impact load is input, and more certainly causes the front side frames 30 and 30 to deform at sites forward of the power unit mount-fastening portions 31 and 31.

Furthermore, of the left and right front side frames 30 and 30, portions where the fragile portions 32 and 32 are formed are more waned to the vehicle widthwise center side than portions forward and rearward of those portions. This construction lessens the cross-sectional areas of the fragile portions 32 and 32 in the vehicle width direction and allows the bending rigidity of the fragile portions 32 and 32 to be reduced. Thus, the fragile portions 32 and 32 are designed to readily deform when impact load is input, so that the front side frames 30 and 30 will more certainly deform at sites forward of the power unit mount-fastening portions 31 and 31.

Furthermore, the fragile portions 32 and 32 are formed continuously to front ends of the power unit mount-fastening portions 31 and 31. That is, the fragile portions 32 and 32 whose cross-sectional area is relatively small and the power unit mount-fastening portions 31 and 31 whose cross-sectional area is relatively large are continuous to each other. Since the cross-sectional area of each front side frame 30 greatly changes at a site of continuous connection between the fragile portion 32 and the power unit mount-fastening portion 31, the bending at this site is promoted. Thus, each front side frame 30 can be more certainly caused to deform at a site forward of the power unit mount-fastening portion 31.

Referring to FIG. 2, the extended line EL obtained by linearly extending the oblique side 53a rearward extends in the vehicle widthwise center side of the power unit mount-fastening portion 31. This causes the front side frame 30 to more certainly and easily deform to the vehicle widthwise center side.

Furthermore, the front end of the outer frame 50 and the front end of the inner frame 40 are joined to the connection member 70 and therefore interconnected to each other. When a narrow offset collision occurs, load can sometimes act in such a direction as to separate the outer frame 50 from the inner frame 40. Since the outer frame 50 and the inner frame 40 are interconnected at their front ends, separation of the outer frame 50 from the inner frame 40 can be restrained.

Furthermore, of the connection member 70, the end portion P2 at the vehicle outer side is located more rearward than the end portion p1 at the vehicle widthwise center side. Due to this construction, when a narrow offset collision occurs, collision load can be guided toward the vehicle widthwise center side. Furthermore, the bending moment to an inner side will be promoted, separation of the outer frame 50 from the inner frame 40 will be restrained, and the front side frame 30 will easily bend to the inner side.

Furthermore, rear portions of the triangular portions 52 and 53 of the outer frame 50 are provided with the reinforcement member 80 that is attached thereto from the vehicle outer side. The rear portions of the triangular portions 52 and 53 are smaller in cross-sectional area and lower in strength than front portions of the triangular portions 52 and 53. The provision of the reinforcement member 80 restrains the front side frame 30 from bending at the triangular portions 52 and 53. Therefore, load will be more certainly transmitted to a site forward of the power unit mount-fastening portion 31 so that the front side frame 30 will bend at that site toward the vehicle widthwise center side.

Furthermore, in each front side frame 30, the fragile portion 32 is formed at a site between the triangular portions 52 and 53 and the power unit mount-fastening portion 31. The provision of the fragile portion 32 facilitates the bending of the front side frame 30 to the vehicle widthwise center side. Therefore, the front side frames 30 and 30 can each be more certainly bent at a site forward of the power unit mount-fastening portion 31.

Furthermore, in the front side frame 30, the bulkhead 33 is provided between the triangular portions 52 and 53 and the fragile portion 32 so as to partition the space that is formed within the front side frame 30 and that has a closed quadrangular cross-sectional shape. The provision of the bulkhead 33 promotes the transmission of load from the triangular portions 52 and 53 to an inner-side side wall of the front side frame 30 and therefore causes the front side frame 30 to more easily deform to the inner side.

In addition, the strength of the front side frame 30 at a site where the bulkhead 33 is provided is enhanced by the bulkhead 33. Therefore, the bending of a portion of the front side frame 30 forward of the fragile portion 32 can be restrained and the front side frame 30 will more certainly bend at the fragile portion 32.

Furthermore, the triangular portion 53 is provided with the beads 63 and 64 that extend in the vehicle width direction. The provision of the beads 63 and 64 increase the bending rigidity of the triangular portion 53 in the vehicle width direction, so that the front side frame 30 will more certainly bend at a site forward of the power unit mount-fastening portion 31. Moreover, by forming the beads 63 and 64 on the triangular portion 53, surface rigidity can be increased. Due to this, restraint of the production of noise due to vibration, that is, improvement of noise/vibration (NV) performance, can be expected.

Referring also to FIG. 4, the outer frame 50 has a substantially U shape whose opening faces the inner frame 40. The boundary portions 59a and 59b between the bottom portion 51 and the wall portions 52 and 53 of the outer frame 50 have a bead shape. This construction increases the bending rigidity of the triangular portion 53 in the front-to-rear direction, so that the front side frame 30 will more certainly bend at a site forward of the power unit mount-fastening portion 31. Moreover, because the boundary portions 59a and 59b have a bead shape, the number of ridges extending substantially in the vehicle width directions is increased. Due to this, collision load at the time of a narrow offset collision can be more certainly transmitted from the vehicle widthwise outward side to an inner side of the front side frame 30.

Although the vehicle front body structure according to the present disclosure has been described in conjunction with the left-side structure of the vehicle front body as an example, the right-side structure of the vehicle front body is substantially the same. Therefore, the description of the left-side structure of the vehicle front body can be interpreted as a description of the right-side structure of the vehicle front body, as appropriate.

The present disclosure is not limited by the foregoing embodiment or the like but also includes other constructions that achieve the operation and advantageous effects of the present disclosure.

The vehicle front body structure of the present disclosure is suitable for a vehicle body of a passenger car.

What is claimed is:

1. A vehicle front body structure comprising:
left and right front side frames each extending in a vehicle front-to-rear direction and having a power unit mount-fastening portion configured to hold a power unit of a vehicle between the left front side frame and the right front side frame, wherein,
each of the left and right front side frames comprises an inner frame and an outer frame extending together from its front end side to its rear end side along the vehicle front-to-rear direction, the outer frame being attached to a vehicle outer side of the inner frame so as to form a rectangular cross-section defined by the inner frame and the outer frame in a vehicle width direction,
each outer frame has a triangular portion at the front end side, the triangular portion having, in its plan view, a substantially triangular shape whose width in the vehicle width direction decreases from the front end side toward the rear end side,
each front side frame has each power unit mount-fastening portion on a side rearward of the triangular portion in the vehicle front-to-rear direction, and
the vehicle front body structure further comprises left and right lower members each disposed on an outer side of each triangular portion in the vehicle width direction.

2. The vehicle front body structure according to claim 1, wherein
the substantially triangular shape has an oblique side that extends in substantially a linear direction toward the rear end side and has an oblique angle converging to the vehicle outer side of the inner frame such that the extending direction of the oblique side points toward a vehicle center side inward of the power unit mount-fastening portion in the vehicle width direction.

3. The vehicle front body structure according to claim 1, further comprising a connection member that interconnects and joins a front end of the outer frame and a front end of the inner frame of each front side frame.

4. The vehicle front body structure according to claim 3, wherein
the connection member has a vehicle center-side end and a vehicle outer-side end that is located rearward of the vehicle center-side end in the vehicle front-to-rear direction.

5. The vehicle front body structure according to claim 1, further comprising a reinforcement member disposed on a rear portion of the triangular portion at a vehicle outer side thereof.

6. The vehicle front body structure according to claim 1, wherein
each of the left and right front side frames has a fragile portion at a site between the triangular portion and the power unit mount-fastening portion.

7. The vehicle front body structure according to claim 6, further comprising a bulkhead provided in each of the left and right front side frames at a site between the triangular portion and the fragile portion, the bulkhead partitioning an inside space of each side frame along the rectangular cross-section thereof.

8. The vehicle front body structure according to claim 1, wherein
the triangular portion has a bead that extends in the vehicle width direction.

9. The vehicle front body structure according to claim 1, wherein
the outer frame has a bottom portion, a wall portion and a boundary portion between the bottom portion and the wall portion, which define a substantially U shape in a cross-sectional view, an opening of the U shape facing the inner frame, each of the boundary portion and the wall portion of the outer frame having a bead.

* * * * *